United States Patent
Weber et al.

(10) Patent No.: US 10,243,935 B2
(45) Date of Patent: Mar. 26, 2019

(54) USER AUTHENTICATION BASED ON TRACKED ACTIVITY

(71) Applicant: LENOVO Enterprise Solutions (Singapore) PTE. LTD., New Tech Park (SG)

(72) Inventors: John M. Weber, Wake Forest, NC (US); Gary D. Cudak, Wake Forest, NC (US); Shareef F. Alshinnawi, Apex, NC (US); Joseph F. Herman, Raleign, NC (US)

(*) Notice: Subject to any disclaimer, the term of this patent is extended or adjusted under 35 U.S.C. 154(b) by 149 days.

(21) Appl. No.: 15/140,817

(22) Filed: Apr. 28, 2016

(65) Prior Publication Data

US 2017/0317993 A1 Nov. 2, 2017

(51) Int. Cl.
G06F 21/00 (2013.01)
H04L 29/06 (2006.01)
H04L 29/08 (2006.01)

(52) U.S. Cl.
CPC .......... *H04L 63/06* (2013.01); *H04L 63/08* (2013.01); *H04L 63/10* (2013.01); *H04L 67/22* (2013.01)

(58) Field of Classification Search
CPC ......... H04L 63/06; H04L 67/22; H04L 63/08; H04L 63/10
See application file for complete search history.

(56) References Cited

U.S. PATENT DOCUMENTS

| | | | |
|---|---|---|---|
| 8,850,537 B1* | 9/2014 | Dotan | H04L 63/08 726/6 |
| 9,083,527 B1* | 7/2015 | McCorkendale | H04L 9/28 |
| 9,565,562 B1* | 2/2017 | Bar-Menachem | H04W 12/06 |
| 9,602,508 B1* | 3/2017 | Mahaffey | H04L 63/0869 |
| 9,888,377 B1* | 2/2018 | McCorkendale | H04W 12/04 |
| 2008/0155651 A1* | 6/2008 | Wasmund | G06F 21/316 726/2 |
| 2012/0214442 A1* | 8/2012 | Crawford | H04W 12/06 455/411 |

(Continued)

OTHER PUBLICATIONS

Wikipedia, "Multi-factor authentication", https://en.wikipedia.org/w/index.php?title=Multi-factor_authentication&oldid=702037830, last visited Feb. 11, 2016, Page was last modified on Jan. 28, 2016.

(Continued)

*Primary Examiner* — Brandon S Hoffman
*Assistant Examiner* — William A Corum, Jr.
(74) *Attorney, Agent, or Firm* — Kunzler, PC

(57) ABSTRACT

An apparatus for user authentication based on tracked activity includes an activity tracker module, a challenge module, and an authentication module. The activity tracker module is configured to electronically track one or more activities of a user. Electronically tracking the one or more activities includes obtaining information about at least one activity from an electronic device of the user. The challenge module is configured to present an authentication challenge to the user via a user interface for the electronic device. The authentication challenge is based on the one or more electronically tracked activities for the user. The authentication module is configured to determine whether to authenticate the user for access to one or more resources via the electronic device, based on the user's response to the authentication challenge.

18 Claims, 4 Drawing Sheets

(56) References Cited

U.S. PATENT DOCUMENTS

| | | | | |
|---|---|---|---|---|
| 2012/0216260 A1* | 8/2012 | Crawford | ................ | G06F 21/31 |
| | | | | 726/5 |
| 2013/0318580 A1* | 11/2013 | Gudlavenkatasiva | .. | G06F 21/31 |
| | | | | 726/7 |
| 2014/0137219 A1* | 5/2014 | Castro | .................... | H04L 67/02 |
| | | | | 726/6 |
| 2015/0026796 A1* | 1/2015 | Alan | ....................... | G06F 21/31 |
| | | | | 726/19 |
| 2015/0161366 A1* | 6/2015 | Ghosh | .................... | G06F 21/31 |
| | | | | 726/7 |
| 2015/0365401 A1* | 12/2015 | Brown | ............... | H04L 63/0838 |
| | | | | 726/7 |
| 2017/0053280 A1* | 2/2017 | Lishok | ............... | G06Q 20/4014 |
| 2017/0250968 A1* | 8/2017 | Licht | .................... | H04L 9/3271 |

OTHER PUBLICATIONS

SMPASSCODE, Solution Highlights, http://www.smspasscode.com/what-we-do/multi-factor-authentication/sol/, last visited Feb. 11, 2016.

UC Davis Graduate School of Management, "Web User Behavioral Profiling for User Identification", http://gsm.ucdavis.edu/research/web-user-behavioral-profiling-user-identification, Last visited Feb. 11, 2016.

\* cited by examiner

USER AUTHENTICATION BASED ON TRACKED ACTIVITY

FIELD

The subject matter disclosed herein relates to user authentication and more particularly relates to user authentication based on tracked user activity.

BACKGROUND

Authenticating a user of an electronic device may involve confirming the user's identity before granting access to resources such as data, applications, computer systems, physical facilities, or the like. If an unauthorized user is able to access a device, data, or applications belonging to another user, the unauthorized user may be able to steal money, other property, data, an authorized user's identity, or the like. One method of user authentication prompts a user to enter a secret password before granting access to resources. However, a secure password that is not easily guessed by predictive or brute force algorithms may also be difficult to remember.

BRIEF SUMMARY

An apparatus for user authentication based on tracked activity is disclosed. A method and computer program product also perform the functions of the apparatus. The apparatus includes an activity tracker module, a challenge module, and an authentication module. The activity tracker module is configured to electronically track one or more activities of a user. Electronically tracking the one or more activities includes obtaining information about at least one activity from an electronic device of the user. The challenge module is configured to present an authentication challenge to the user via a user interface for the electronic device. The authentication challenge is based on the one or more electronically tracked activities for the user. The authentication module is configured to determine whether to authenticate the user for access to one or more resources via the electronic device, based on the user's response to the authentication challenge.

In one embodiment, the apparatus includes an authentication trigger module configured to determine whether an authentication trigger has occurred. In a certain embodiment, the authentication trigger is based on a time since a previous authentication, an attempt to access a resource, an attempt to perform an operation, and/or a location for the user. In a further embodiment, the challenge module presents the authentication challenge in response to the authentication trigger module determining that the authentication trigger has occurred.

In some embodiments, electronically tracking the one or more activities of the user includes gathering information about a location for the user, an internet resource accessed by the user, an application used by the user, an electronic file accessed by the user, an interaction with another user, a financial transaction by the user, and/or a wireless network joined by the user.

In one embodiment, the authentication challenge is based on at least one activity of the user that occurred prior to a previous successful authentication of the user. In some embodiments, the authentication challenge includes a query such that a correct answer to the query involves the user's knowledge of the one or more activities. In a certain embodiment, a difficulty of the authentication challenge is based on a response to a previous authentication challenge, a risk related to the one or more resources, and/or a risk related to the one or more electronically tracked activities. In a further embodiment, the difficulty of the authentication challenge increases based on an incorrect response to a previous authentication challenge. In some embodiments, the authentication module is configured to deny access to the one or more resources in response to a limit of incorrect responses being reached.

In one embodiment, the authentication module is configured to deny access to the one or more resources based on an incorrect response to the authentication challenge. In a further embodiment, the authentication module is configured to lock the electronic device in response to a predetermined number of incorrect responses to authentication challenges. In a certain embodiment, the authentication module is configured to grant access to the one or more resources based on a correct response to the authentication challenge.

A method for user authentication based on tracked activity includes electronically tracking one or more activities of a user. Electronically tracking the one or more activities includes obtaining information about at least one activity from an electronic device of the user. The method includes presenting an authentication challenge to the user via a user interface for the electronic device. The authentication challenge is based on the one or more electronically tracked activities for the user. The method includes determining whether to authenticate the user for access to one or more resources via the electronic device, based on the user's response to the authentication challenge.

In one embodiment, the method includes determining whether an authentication trigger has occurred. In a certain embodiment, the authentication trigger is based on a time since a previous authentication, an attempt to access a resource, an attempt to perform an operation, and/or a location for the user. In a further embodiment, presenting the authentication challenge is in response to determining that the authentication trigger has occurred.

In some embodiments, electronically tracking the one or more activities of the user includes gathering information about a location for the user, an internet resource accessed by the user, an application used by the user, an electronic file accessed by the user, an interaction with another user, a financial transaction by the user, and/or a wireless network joined by the user.

In one embodiment the authentication challenge is based on at least one activity of the user that occurred prior to a previous successful authentication of the user. In some embodiments, the authentication challenge includes a query such that a correct answer to the query involves the user's knowledge of the one or more activities. In a certain embodiment, a difficulty of the authentication challenge is based on a response to a previous authentication challenge, a risk related to the one or more resources, and/or a risk related to the one or more electronically tracked activities.

In one embodiment, the method includes denying access to the one or more resources based on an incorrect response to the authentication challenge. In another embodiment, the method includes granting access to the one or more resources based on a correct response to the authentication challenge.

A program product for user authentication based on tracked activity includes a computer readable storage medium that stores code executable by a processor. The executable code includes code to perform electronically tracking one or more activities of a user. Electronically tracking the one or more activities includes obtaining information about at least one activity from an electronic device of the user. The executable code includes code to perform presenting an authentication challenge to the user via a user interface for the electronic device. The authentication challenge is based on the one or more electronically tracked activities for the user. The executable code includes code to perform determining whether to authenticate the user for access to one or more resources via the electronic device, based on the user's response to the authentication challenge.

In one embodiment the executable code includes code to perform determining whether an authentication trigger has occurred. In a certain embodiment, the authentication trigger is based on time since a previous authentication, an attempt to access a resource, an attempt to perform an operation, and/or a location for the user. In a further embodiment, presenting the authentication challenge is in response to determining that the authentication trigger has occurred.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
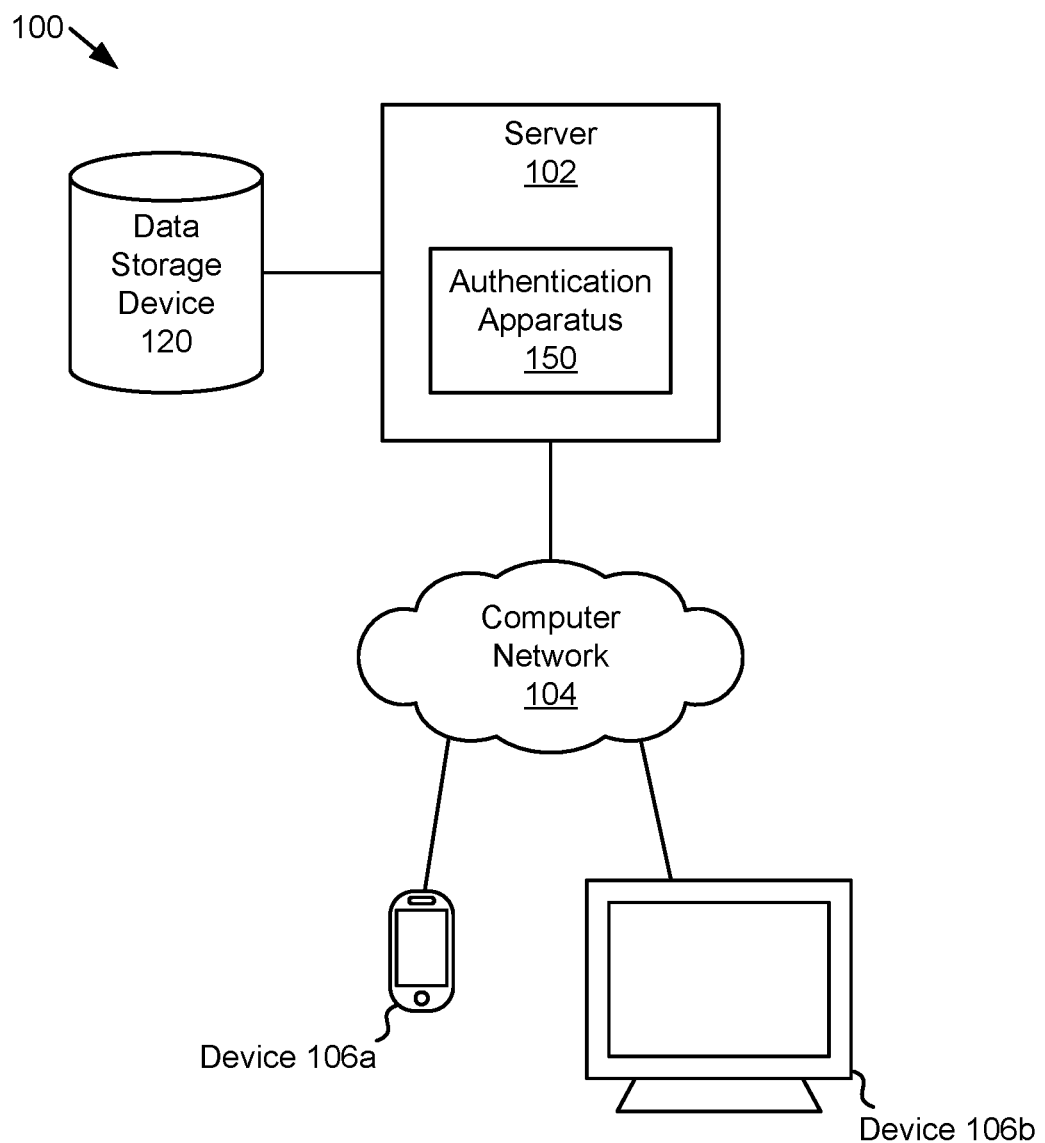
FIG. 1 is a schematic block diagram illustrating one embodiment of a system for user authentication based on tracked activity.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for user authentication based on tracked activity. In the depicted embodiment, the system 100 includes an authentication apparatus 150 operating on a server 102, a computer network 104, one or more electronic devices 106, and a data storage device 120.

In general, in various embodiments, the authentication apparatus 150 may electronically track one or more activities of a user, present an authentication challenge to the user based on the one or more electronically tracked activities, and determine whether to authenticate the user based on the user's response to the authentication challenge. In certain embodiments, presenting an authentication challenge based on tracked user activities may allow the authentication apparatus 150 to authenticate a user based on the user's knowledge of his or her own activities. In various embodiments, a user may remember his or her own activities more easily than a password. Additionally, in certain embodiments, presenting an authentication challenge based on tracked user activities may allow the authentication apparatus 150 to scale the difficulty of the authentication challenge to meet different security needs. The authentication apparatus 150 is described in further detail below with regard to the apparatuses 200, 300 of FIGS. 2 and 3.

In the depicted embodiment, the authentication apparatus 150 operates on or is embodied by the server 102. In another embodiment, the authentication apparatus 150 may operate on or be embodied by one or more of the user's electronic devices 106, a combination of the server 102 and the user's electronic devices 106, a computer that implements the authentication apparatus 150 outside a server/client architecture, or the like. In view of this disclosure, many ways to implement an authentication apparatus 150 are clear.

In one embodiment, the server 102 may be a mainframe, a blade server, a workstation, a desktop computer, a laptop computer, a virtual machine, or the like. The server 102 may use the authentication apparatus 150 to control access to resources of the system 100, the server 102, the user's electronic devices 106, other computers via the computer network 104, physical resources such as a room or a building, or the like.

In various embodiments, one or more electronic devices 106 of the user may be in communication with the server 102 via the computer network 104. For example, in the depicted embodiment, the user's electronic devices 106 include a mobile phone 106a and a computer 106b. In another embodiment, the system 100 may include more or fewer electronic devices 106 of a user. For example, in one embodiment, the system 100 may include one electronic device 106, such as a mobile phone 106a, for the user. In another embodiment, the system 100 may include multiple electronic devices 106 for the user, such as a mobile phone 106a, a home computer 106b, a work computer, a home theater PC, a game console, an internet connected television, a fitness monitor, or the like.

In one embodiment, a user may request access to one or more resources via one of the electronic devices 106, and the electronic device 106 may use or communicate with the authentication apparatus 150 to determine whether to authenticate the user. For example, in one embodiment, a user may use a browser operating on one of the user's electronic devices 106 to log into a website hosted by the server 102 (or with a login component of the website operating on the server 102), and the server 102 may use the authentication apparatus 150 to authenticate the user. In another embodiment, a user may use a mobile phone app operating on one of the user's electronic devices 106 to access a service provided by the server 102 (or with a login component of the website operating on the server 102), and the server 102 may use the authentication apparatus 150 to authenticate the user. In another embodiment, the authentication apparatus 150 may attempt to unlock one of the user's electronic devices 106, and the electronic device 106 may use or communicate with the authentication apparatus 150 to authenticate the user, to determine whether or not to unlock the device 106. In view of this disclosure, many implementations that use an authentication apparatus 150 to authenticate a user are clear.

The computer network 104, in various embodiments, may include a local area network ("LAN"), a wireless connection, an Internet connection, or the like. The computer network 104 may include one or more switches, routers, data cables, transmitters, and the like normally associated with a computer network 104. In one embodiment, the computer network 104 includes multiple networks functioning to transmit data between the server 102 and the user's electronic devices 106, between the data storage device 120 and the server 102, or the like.

A wireless connection for the computer network 104 may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM®"), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA®"). Alternatively, the wireless connection may be a cellular telephone network communication. All standards and/or connection types include the latest version and revision of the standard and/or connection type as of the filing date of this application.

In one embodiment, the data storage device 120 is internal to the server 102 or other computing device that includes the authentication apparatus 150. In another embodiment, the data storage device 120 is located externally to the server 102, laptop, etc. that includes the authentication apparatus 150. For example, the data storage device 120 may include one or more computer readable storage media in a network, such as a storage area network, in an array, etc. The data storage device 120 may include a hard drive, solid state drive, hybrid drive, storage array, or the like. In certain embodiments, the data storage device 120 may store information about one or more electronically tracked user activities. In various embodiments, presenting an authentication challenge based on information about electronically tracked user activities stored by the data storage device 120 may allow the authentication apparatus 150 to confirm a user's identity, or to determine whether a user is authorized or unauthorized to access resources controlled by the system 100. One of skill in the art will recognize other forms of a data storage device 120 for storing information about tracked user activities, in communication with an authentication apparatus 150.

Figure 2:
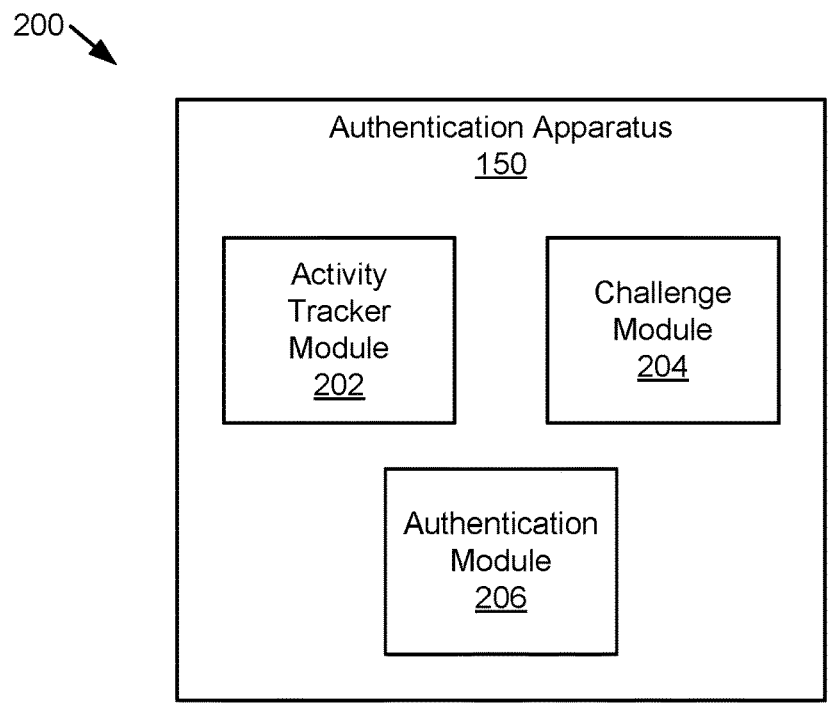
FIG. 2 is a schematic block diagram illustrating one embodiment of an apparatus for user authentication based on tracked activity.

FIG. 2 depicts one embodiment of an apparatus 200 for user authentication based on tracked activity. The apparatus 200 includes one embodiment of the authentication apparatus 150 with an activity tracker module 202, a challenge module 204, and an authentication module 206, which are described below.

In one embodiment, the apparatus 200 includes an activity tracker module 202 configured to electronically track one or more activities of a user. In various embodiments, an activity tracker module 202 may include a data storage device 120, a database storing information about electronically tracked user activities, user interface elements such as a screen, a touch screen, a keyboard, speakers, a microphone, or the like, sensors such as a GPS sensor, one or more electronic devices 106 of the user, a hardware circuit, a programmable hardware device, one or more processors, and/or a computer readable storage medium that stores code for execution by one or more processors. Other embodiments may include similar or equivalent devices for electronically tracking user activities.

In certain embodiments, a user may include any person who uses an electronic device 106, who may seek to access one or more resources via the electronic device 106. In various embodiments, the apparatus 200 may track user activities, present an authentication challenge based on the tracked user activities, and determine whether to authenticate the user for access to the one or more resources via the electronic device 106, based on the user's response to the authentication challenge. In general, determining whether to authenticate a user may provide security for various resources by preventing or discouraging unauthorized users from using the resources.

In various embodiments, electronically tracked activities of a user may include any activity, action, behavior, habit, individual event, or the like, for the user, that may be tracked via one or more of the user's electronic devices 106. For example, in one embodiment, a user's tracked activities may include physical activities, and the activities may be tracked by obtaining information about the activities such as location (via GPS, cellular tower location, or the like), time, distance travelled, or the like. In some embodiments, a user's tracked activities may include virtual or online activities, and the activities may be tracked by obtaining information about web sites visited, files accessed, applications used, online transactions, or the like.

In a certain embodiment, electronically tracking one or more activities of a user includes obtaining information about at least one activity from an electronic device 106 of the user. In one embodiment, obtaining information from an electronic device 106 of the user may include communicating the information to a server 102, another device 106 of the user, or the like. In another embodiment, the apparatus 200 may operate on (or partially on) the device 106 that obtains the information, and obtaining information from an electronic device 106 of the user may include generating the information in one part of the electronic device 106 (via a GPS sensor, web browser, application, or the like), and communicating the information to the apparatus 200 on the device 106. Thus, in various embodiments, obtaining information from an electronic device 106 may include receiving information outside the electronic device 106, or receiving information within the electronic device 106.

In some embodiments, information obtained about at least one activity may include any information relating to or describing the activity, and may include information directly describing the activity, such as an amount and an item purchased for a financial transaction, information about an application that was used, or the like, and/or information describing the context of the activity, such as a location, a time, a wireless network that was in use, or the like. Thus, in various embodiments, electronically tracking one or more activities of the user may include gathering information about a location for the user, an internet resource accessed by the user, an application used by the user, an electronic file accessed by the user, an interaction with another user, a financial transaction by the user, a wireless network joined by the user, or the like.

For example, in one embodiment, information about a location for the user may include information such as latitude and longitude coordinates, the location of a nearby cellular tower, a street address for the user, a distance travelled, a planned route, or the like. As another example, information about an internet resource accessed by the user might include access histories, edit histories, log in times, or the like, in reference to a user accessing a web page, a web application, a file or other media accessed online, a social media account, an email account, a remotely accessed computer, or the like. In view of this disclosure, many types of information that may be obtained about a user's activities will be clear.

In one embodiment, the activity tracker module 202 may operate in the background of one or more of the user's electronic devices 106, to obtain information about the user's activities. In another embodiment, the information about the user's activities may be recorded separately from the apparatus 200, and the activity tracker module 202 may obtain the information at a later time. For example, in one embodiment, a web browser may maintain a browsing history for the user, and the activity tracker module 202 may periodically communicate with the web browser to obtain the history.

In one embodiment, the apparatus 200 includes a challenge module 204 configured to present an authentication challenge to the user via a user interface for one of the user's electronic devices 106. In a further embodiment, the authentication challenge is based on the one or more electronically tracked activities for the user. In various embodiments, a challenge module 204 may include a data storage device 120, a database of information about electronically tracked user activities, user interface elements such as a screen, a touch screen, a keyboard, speakers, a microphone, or the like, a hardware circuit, a programmable hardware device, one or more processors, and/or a computer readable storage medium that stores code for execution by one or more processors. Other embodiments may include similar or equivalent devices for presenting an authentication challenge.

In various embodiments, an authentication challenge may refer to any challenge, query, prompt, or interaction that prompts or allows a user to provide a response for the purposes of determining whether to authenticate the user. As a simple example, an authentication challenge (not based on tracked activities) may be a request for the user to enter a password, a security question for the user to answer (such as "what is the name of your first pet?"), or the like. As a further example, one type of authentication challenge based on a user's tracked activities may be a question about an item the user recently purchased online. In general, in various embodiments, users may be authenticated (or not) for access to various resources based on the users' responses to authentication challenges. Determining whether to authenticate a user, based on the user's response to an authentication challenge, is described further below with reference to the authentication module 206.

In one embodiment, presenting an authentication challenge via a user interface for one (or more) of the user's electronic devices 106 may include any way of using the user interface to present the authentication challenge, such as displaying the authentication challenge on a lock screen, audibly presenting the authentication challenge via a text-to-speech interface, integrating the authentication challenge with an application for the device 106, integrating the authentication challenge with a web page accessed by the device 106, or the like. Various devices 106 with different user interfaces may present authentication challenges in different ways. In view of this disclosure, many ways of presenting an authentication challenge via a user interface for a device 106 will be clear.

Similarly, the challenge module 204 may receive a response to an authentication challenge in various ways, via a user interface for one or more of the user's electronic devices 106. In one embodiment, the challenge module 204 may operate on one of the user's devices 106 to present an authentication challenge, and a single device 106 may track the user's activities, present an authentication challenge, and authenticate the user. In another embodiment, tracking, challenging, and authenticating may be performed by more than one device 106. For example, in one embodiment, multiple devices 106 may track user activity, and the user may seek authentication on one device 106, that presents the authentication challenge and receives the response. In another embodiment, one device 106, such as a desktop computer 106b may determine whether to authenticate the user, and may receive the authentication response, but another device 106, such as a phone 106a may present the authentication challenge. In some embodiments, presenting an authentication challenge on a device 106 that has been previously registered or authenticated as the user's device may provide multi-factor authentication, based on what the user has (the device 106) and what the user knows (the response to the authentication challenge).

In one embodiment, the activity tracker module 202 tracks activities of a user through one device 106, such as a phone 106a and the challenge module 204 may present an authentication challenge on another device 106, such as a desktop computer 106b. In the embodiment, the desktop computer 106b has access to information about the user's tracked activities on the phone 106a, for example via the computer network 104, server 102 and authentication apparatus 150.

In certain embodiments, the authentication challenge presented by the challenge module 204 is based on the electronically tracked activities for the user, as tracked by the activity tracker module 202. In various embodiments, a challenge is based on a user's electronically tracked activities if correctly responding to the challenge involves knowing, retrieving, providing, or otherwise using information about one or more of the electronically tracked activities. In one embodiment, an authentication challenge may be based on one of the user's tracked activities. For example, in a certain embodiment, an administrator or an authenticated user could configure the challenge module 204 to present authentication challenges based on one particular tracked activity. In some embodiments, each time an authentication challenge is presented, the challenge module 204 may randomly select one tracked activity, and base the authentication challenge on the randomly selected activity. In another embodiment, an authentication challenge may be based on more than one of the user's activities. For example, in one embodiment, an authentication challenge may be based on at least one physical activity and at least one online activity for the user.

In one embodiment, the authentication challenge may include a query such that a correct answer to the query involves the user's knowledge of the one or more electronically tracked activities for the user. In general, in some embodiments, an authentication challenge that involves the user's knowledge of his or her own activities may allow a user who remembers his or her own activities to easily provide a correct response (because a user may remember his or her own activities more easily than a password), but may also make it difficult for unauthorized persons who do not have personal knowledge of the user's activities to provide a correct response, except by guessing.

In certain embodiments, a query for an authentication challenge may include any form of query or question that allows a user to provide a response. For example, a query may be a multiple choice question, where the user is prompted to select information that matches the user's tracked activities from a list of possible responses (e.g., "Which of these locations were you at last night?"). In another embodiment, a query may be a multiple choice question, where the user is prompted to select information that does not match the user's tracked activities from a list of possible responses (e.g., "Which of these stores have you not shopped at in the last month?"). In a further embodiment, the user might be prompted to select one answer, or to select all correct answers. In another embodiment, a query may be a yes or no question. In still another embodiment, a query might prompt a user for a brief freeform response (e.g., "Name one item from your most recent online purchase.") In a further embodiment, freeform responses may be compared for similarity to the electronically tracked information for the user, rather than for an exact match, to compensate for natural variation in how users might respond. Various types of queries that an authentication challenge may include will be clear in view of this disclosure.

In some embodiments, an authentication challenge may include one or more queries that involve the user's knowledge of the one or more electronically tracked activities for the user. For example, in one embodiment, a simple authentication challenge (e.g., for low security levels) may include a single query. In another embodiment, a more complex authentication challenge (e.g., for higher security levels) may include multiple queries, and the response to the authentication challenge may include the set of responses to individual queries. Authentication based on multiple queries may reduce the risk of correct guesses by an unauthorized user. In another embodiment, an authentication challenge may include a single query, but one or more further authentication challenges may be subsequently, adaptively presented by the challenge module 204 based on responses to previous authentication challenges.

In one embodiment, the authentication challenge presented by the challenge module 204 may be based on at least one activity of the user that occurred prior to a previous successful authentication of the user. One risk of authenticating a user based on electronically tracked information about the user's activities, obtained from the user's devices 106, is that the information obtained from a device 106 may actually be information about an unauthorized person who stole (or otherwise improperly obtained) the device 106. For example, an unauthorized person could steal a device 106, wait a week, and then correctly respond to an authentication challenge based on the location of the device 106 within the last week. However, in a certain embodiment, an authentication challenge based on at least one activity of the user that occurred prior to a previous successful authentication may increase the likelihood that the information obtained from a device 106 about that activity relates to the user, and not to an unauthorized person.

For example, in one embodiment, an activity may be tracked, and then verified as the user's activity by a subsequent successful authentication of the user (suggesting that the user's device 106 has not been stolen), before the tracked activity is used as the basis for an authentication challenge. In another embodiment, where a user may have multiple devices 106, activity tracked by one device 106 may be verified as the user's activity, by a subsequent successful authentication of the user via the same device 106 (suggesting, at least, that that device 106 has not been stolen), before the tracked activity is used as the basis for an authentication challenge.

In certain embodiments, the challenge module 204 may vary the difficulty of authentication challenges in response to various conditions. A difficulty of the authentication challenge, in various embodiments, may refer to how easy or difficult the authentication challenge is expected to be. For example, the challenge module 204 may increase the difficulty of an authentication challenge by asking more questions, by providing more options for multiple choice questions, by increasing the number of plausible, but incorrect, answers to multiple choice questions, by asking for more specific details about the user's tracked activity, or the like. Similarly, the challenge module 204 may decrease the difficulty of an authentication challenge by asking fewer questions, asking easier questions, asking for details about more recent or more easily remembered activities, or the like. In view of this disclosure, many ways of varying the difficulty of an authentication challenge will be clear.

In one embodiment, the difficulty of an authentication challenge may be based on a response to a previous authentication challenge. For example, the challenge module 204 may present a less difficult authentication challenge if the user has recently provided a correct response to a previous authentication challenge, but may present a more difficult authentication challenge if the user has recently provided an incorrect response to a previous authentication challenge. As a further example, the difficulty of an authentication challenge may be scaled, in one embodiment, based on a time since the most recent correct response to an authentication challenge. In certain embodiments, scaling the difficulty of authentication challenges based on responses to (or information about) previous authentication challenges allows the apparatus 200 to provide an adaptive authentication process that is not needlessly difficult for an authorized user, but that becomes increasingly difficult when an unauthorized person attempts to respond to authentication challenges.

In another embodiment, the authentication module 206 is configured to determine whether to authenticate the user for access to one or more resources, and the difficulty of an authentication challenge presented by the challenge module 204 may be based on a risk related to the one or more resources that the user is attempting to access. A risk relating to the one or more resources that the user is attempting to access may, in certain embodiments, correspond to the severity of the consequences of authenticating a user incorrectly. For example, a higher risk may relate to a financial account, because incorrectly authenticating a user for access to a financial account may result in stolen funds, but a lower risk may relate to a news website, because incorrectly authenticating a user for access to a news website may result in consequences no worse than allowing the users to read articles without a subscription. Thus, in one embodiment, a more difficult challenge may be presented to authenticate the user for access to a financial account, and a less difficult challenge may be presented to authenticate the user for access to a news website.

In another embodiment, the difficulty of an authentication challenge presented by the challenge module 204 may be based on a risk related to the one or more electronically tracked activities. For example, a higher risk may relate to a location that is known to be dangerous, or to a new activity for the user that is inconsistent with previous tracked activity for the user, and a lower risk may relate to a location that the user has previously frequently visited. Thus, in one embodiment a more difficult challenge may be presented in a new or insecure location, and a less difficult challenge may be presented in a familiar or frequently visited location.

In some embodiments, a risk relating to the user's tracked activities, or relating to the resources that the user is attempting to access, may be assigned or predetermined by a previously authenticated user, by an administrator for the apparatus 200, or the like. For example, in one embodiment, a user associating an account with a device 106 may indicate a risk level associated with the account, or a user may designate particular safe physical locations or zones. In a further embodiment, the user may generally designate a risk level for data stored on a device 106. In another embodiment, the challenge module 204 (or another module of the apparatus 200) may evaluate a risk programmatically by comparison to known categories. For example, in one embodiment, the apparatus 200 may determine that an account is a financial account, and determine that a high risk is associated with the account. Many ways of assigning or evaluating a risk relating to the user's tracked activities, or relating to the resources that the user is attempting to access, will be clear in view of this disclosure.

In one embodiment, the apparatus 200 includes an authentication module 206 configured to determine whether to authenticate the user for access to one or more resources via the electronic device 106, based on the user's response to the authentication challenge. In various embodiments, an authentication module 206 may include a data storage device 120, a database of information about electronically tracked user activities, a hardware circuit, a programmable hardware device, one or more processors, and/or a computer readable storage medium that stores code for execution by one or more processors. Other embodiments may include similar or equivalent devices for authenticating the person.

In general, in various embodiments, authenticating a user may involve confirming that the user is correctly identified; either by determining the user's identity, or by confirming that the user's actual identity matches their purported identity (such as a username provided by the user, a user account associated with the device 106, or the like). In particular, in certain embodiments, authenticating a user for access to one or more resources via an electronic device 106 may involve determining or confirming the user's identity, and determining that the user is authorized to access the one or more resources via the device 106.

In certain embodiments, determining whether to authenticate a user for access to one or more resources may include determining to authenticate the user for access to the resources, or determining not to authenticate the user for access to the resources. For example, in one embodiment, the authentication module 206 may determine to authenticate a user for access to resources based on having determined or confirmed the user's identity and on having determined that the user is authorized to access the resources via the device 106. In another embodiment, however, the authentication module 206 may determine not to authenticate a user for access to resources based on failure to determine or confirm the user's identity, or based on determining that the user is not authorized to access the resources in question via the device 106.

In various embodiments, resources that are accessed (or accessible) via a user's electronic device 106 may include resources that are local to the device 106, resources that are remote to the device 106, but that are accessible by the device 106 via a computer network 104, and/or other resources for which access involves the device 106. For example, in one embodiment, resources that are local to the device 106 may include files or applications on the device 106, device functionality or features, or the like. In a certain embodiment, remote resources that are accessible via a computer network 104 may include resources of another device 106, server 102, data storage device 120, other computers connected to the computer network 104, or the like. In a further embodiment, other resources for which access involves the device 106 may include physical facilities, such as a room or a building, or the like, for which access control involves a user signing in or authenticating via the user's device 106. Many types of resources that may be accessed via a user's electronic device 106 will be clear in view of this disclosure.

In one embodiment, the authentication module 206 may track or maintain information about users that are authorized to access various resources via the electronic device 106, and use the information about authorized users to determine whether a user is authorized to access a resource via the device 106. In another embodiment, a device 106 or a resource may track or maintain information about authorized users, and the authentication module 206 may communicate with the device 106 or resource to determine whether a user is authorized to access the resource via the device 106. For example, in one embodiment, an application on the device 106 may provide a list of authorized users to the authentication module 206, and the authentication module 206 may determine whether a user is on the list of authorized users. In another embodiment, the authentication module 206 may determine or confirm a user's identity, and communicate the confirmed identity to a resource (such as an application) to determine whether that user is authorized to access that resource. In view of this disclosure, many ways are clear of determining whether a user, whose identity is determined or confirmed by the authentication module 206, is authorized to access one or more resources via the device 106.

In certain embodiments, determining whether to authenticate a user for access to one or more resources via the electronic device 106, based on a user's response to the authentication challenge, may include determining or confirming the user's identity, based on the user's response to the authentication challenge. In one embodiment, the authentication module 206 may attempt to determine a user's identity, without (or independently of) the user explicitly identifying him- or herself. For example, in one embodiment, the activity tracker module 202 may track information activities for multiple users, and the challenge module 204 may present an authentication challenge based on the tracked activities for multiple users, so that a user's response to the authentication challenge distinguishes that user from other users. Thus, in some embodiments, the apparatus 200 may both identify and authenticate a user. In another embodiment, the authentication module 206 may receive a purported identity for the user (such as a name, username, login, ID number, email address, or the like), and determine whether the user's actual identity matches the purported identity.

In various embodiments, determining whether to authenticate a user for access to one or more resources via the electronic device 106 may be based on the user's response to the authentication challenge in various ways. In one embodiment, a correct response that involves the user's knowledge of his or her own tracked activities may be fully sufficient to determine whether to authenticate the user if it is not likely that other people share the same knowledge about the user's activities. In another embodiment, however, if people other than the user know about the user's activities (e.g., the user's tracked location may have been in a public place), then a correct response may increase a likelihood that the user should be authenticated, but may not provide sufficient certainty (e.g., a likelihood that the user should be authenticated that exceeds a predetermined threshold).

In a further embodiment, a partially correct or incorrect response may indicate that the person responding to the authentication challenge is not the authorized user, because the response does not show that the person is aware of the authorized user's tracked activities. However, in another embodiment, a partially correct or incorrect response may be the result of forgetfulness or mistake by the authorized user. Thus, in one embodiment, an incorrect response may be fully sufficient to determine not to authenticate the user, or to lock the device 106. However, in another embodiment, an incorrect or partially correct response may decrease a likelihood that the user should be authenticated, but may not provide sufficient certainty (e.g., a likelihood that the user should not be authenticated that exceeds a predetermined threshold).

Accordingly, in one embodiment, the authentication module 206 may determine whether to authenticate the user based solely or primarily on the response to an authentication challenge. In another embodiment, however, the authentication module 206 may determine whether to authenticate the user based on a set of factors that includes a response to an authentication challenge and includes other factors, such as responses to additional authentication challenges, a password, a security question, an identity card, a security token, a signature, a fingerprint, a retinal pattern, and/or any other factor based on the user's knowledge, possessions, or inherent attributes.

As a result of determining whether to authenticate the user for access to one or more resources via the electronic device 106, the authentication module 206 may grant or deny access to the one or more resources. For example, in one embodiment, the authentication module 206 may be configured to grant access to the one or more resources based on a correct response to the authentication challenge. In a further embodiment, granting access may include unlocking the device 106, minimizing a user interface element that prevents a user from interacting with a resource such as a file or application, loading a file, application or other resource, connecting to a remote resource, or the like.

In another embodiment, the authentication module 206 may be configured to deny access to the one or more resources based on an incorrect response to the authentication challenge. In a further embodiment, denying access may include locking the device 106, maximizing a user interface element that prevents a user from interacting with a resource such as a file or application, refusing to load a file, application or other resource, refusing to connect to a remote resource, or the like. Many ways of granting or denying access to a resource will be clear in view of this disclosure.

In a certain embodiment, the authentication module 206 is configured to lock the electronic device 106 in response to a predetermined number of incorrect responses to authentication challenges. For example, in one embodiment, the authentication module 206 may deny access to a resource in response to an incorrect response, but a user may again attempt to access the resource, and may receive an additional authentication challenge. Thus, in some embodiments, the authentication module 206 may maintain a count of incorrect responses, and may increment the count for each incorrect response. In various embodiments, the count may be reduced, reset to zero, or the like based on a correct response. In one embodiment, the authentication module 206 may maintain a single count of incorrect responses for multiple devices 106. In another embodiment, the authentication module 206 may maintain multiple counts of incorrect responses on a per-device or per-resource basis. Similarly, a predetermined number of incorrect responses may be maintained on a general, per-device, or per-resource level, and may have a default value, or a value that is set by an authorized user or administrator.

In response to the predetermined number of incorrect responses being reached, the authentication module 206 may lock the device 106. In one embodiment, locking the device 106 may include disabling the device 106 for a period of time. In another embodiment, locking the device 106 may include disabling the device 106 until an authorized user provides further authentication factors (such as a password to unlock the device 106). In a certain embodiment, the authentication module 206 may lock the device 106 with respect to a particular resource by disabling the ability to access that resource via the device 106, but may leave the device 106 unlocked with respect to other resources. In another embodiment, the authentication module 206 may cooperate with the challenge module 204, so that the challenge module 204 increases the difficulty of the authentication challenge, as described above, based on an incorrect response to a previous authentication challenge, and the authentication module 206 denies access to the one or more resources in response to a predetermined number or limit of incorrect responses being reached.

Figure 3:
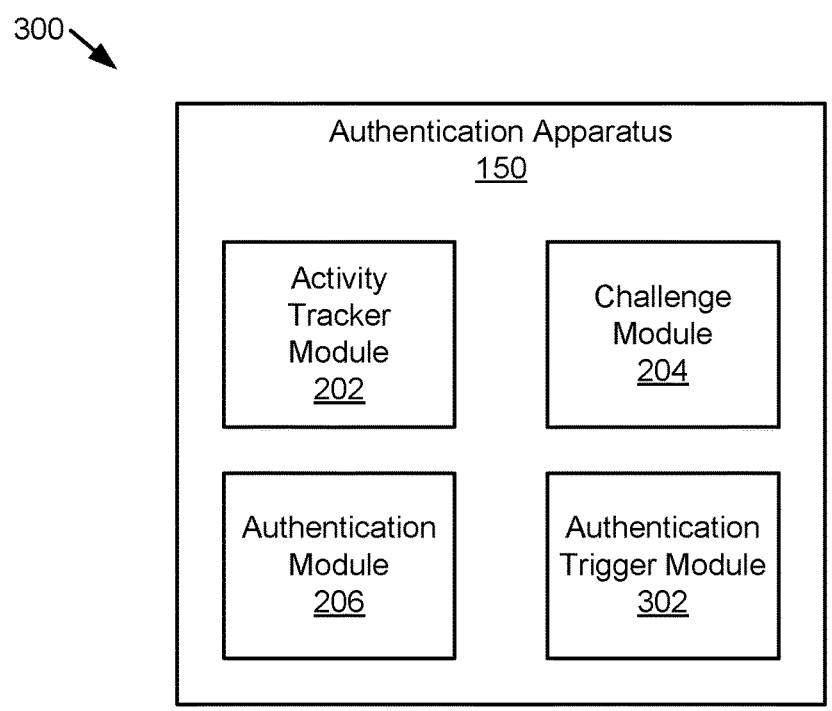
FIG. 3 is a schematic block diagram illustrating another embodiment of an apparatus for user authentication based on tracked activity.

FIG. 3 depicts another embodiment of an apparatus 300 for user authentication based on tracked activity. The apparatus 300 includes another embodiment of the authentication apparatus 150 with an activity tracker module 202, a challenge module 204, and an authentication module 206, which are substantially similar to those described above in relation to the apparatus 200 of FIG. 2. In various embodiments, the apparatus 300 may also include an authentication trigger module 302, which is described below.

In one embodiment, the apparatus 300 includes an authentication trigger module 302 configured to determine whether an authentication trigger has occurred. In various embodiments, an authentication trigger module 302 may include a data storage device 120, a log of attempts to access various resources, user interface elements such as a screen, a touch screen, a keyboard, or the like, one or more electronic devices 106 for the user, a hardware circuit, a programmable hardware device, one or more processors, and/or a computer readable storage medium that stores code for execution by one or more processors. Other embodiments may include similar or equivalent devices for determining whether an authentication trigger has occurred.

In various embodiments, an authentication trigger may include any event, incident, or the like, that indicates that a user should be authenticated before being permitted to access one or more resources. Thus, in a further embodiment, the challenge module 204 presents the authentication challenge in response to the authentication trigger module 302 determining that an authentication trigger has occurred.

In one embodiment, an authentication trigger may be based on a time since a previous authentication. For example, in one embodiment, a user may be authenticated to access a resource for a specific amount of time, and a further attempt to access the resource when the time has elapsed may be an authentication trigger. In another embodiment, an authentication trigger may be based on an attempt to access a resource (e.g., read a file, use an application, or the like), and/or an attempt to perform an operation (e.g., copy or delete a file, reset a device 106, or the like). For example, in one embodiment, any attempt to access a financial account or to transfer funds may be an authentication trigger. In a certain embodiment, an authentication trigger may be based on a location for the user. For example, in one embodiment, an attempt to access a resource in a location not previously visited by the user may be an authentication trigger. In another embodiment, an attempt to access a resource in a location with a high crime rate may be an authentication trigger. Many types of authentication trigger based on factors such as time, resources being accessed, operations being performed, location, or the like will be clear in view of this disclosure.

Figure 4:
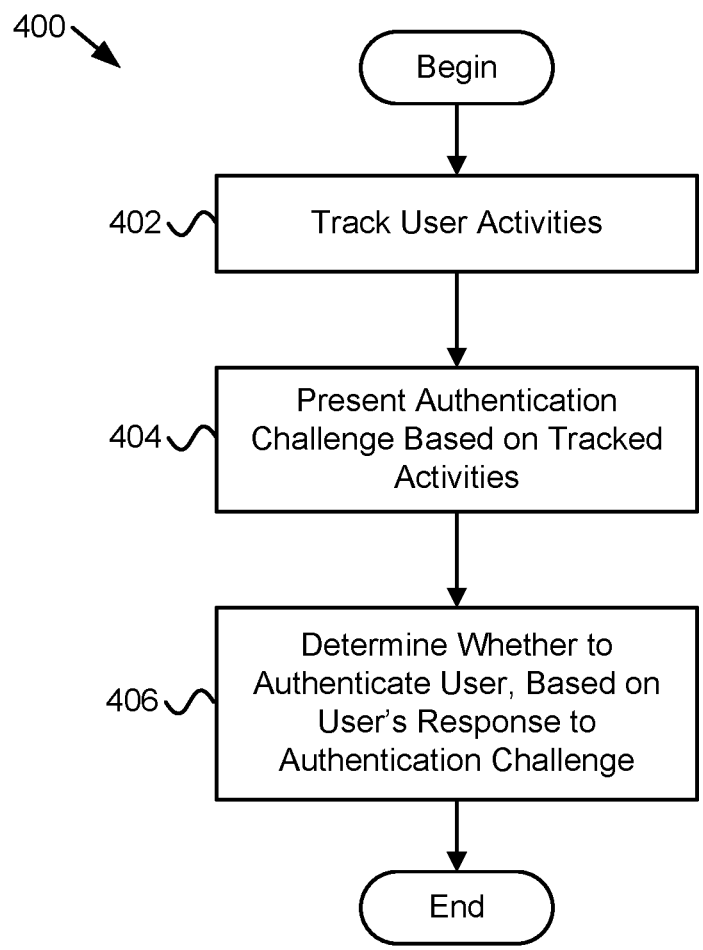
FIG. 4 is a schematic flow chart diagram illustrating one embodiment of a method for user authentication based on tracked activity.

FIG. 4 depicts one embodiment of a method 400 for user authentication based on tracked activity. The method 400 begins and tracks 402 one or more activities of a user. In one embodiment, the activity tracker module 202 tracks 402 the one or more activities. The method 400 presents 404 an authentication challenge to the user based on the one or more tracked activities. In one embodiment, the challenge module 204 presents 404 the authentication challenge. The method 400 determines 406 whether to authenticate the user, based on the user's response to the authentication challenge, and the method 400 ends. In one embodiment the authentication module 206 determines 406 whether to authenticate the person.

Figure 5:
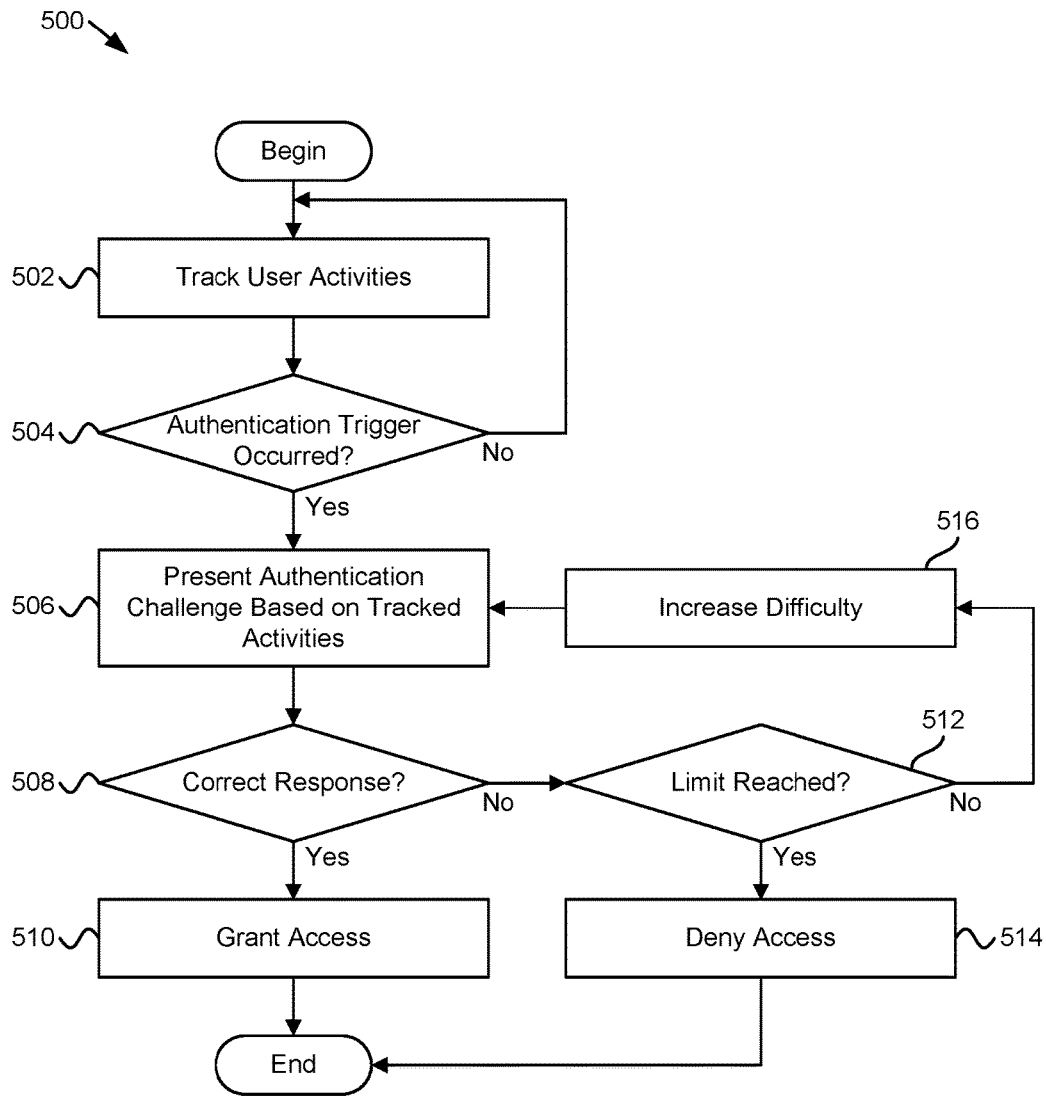
FIG. 5 is a schematic flow chart diagram illustrating another embodiment of method for user authentication based on tracked activity.

FIG. 5 depicts another embodiment of method 500 for user authentication based on tracked activity. The method 500 begins and tracks 502 one or more activities of a user. In one embodiment, the activity tracker module 202 tracks 502 the one or more activities. The method 500 determines 504 whether an authentication trigger has occurred. In one embodiment, the authentication trigger module 302 determines 504 whether an authentication trigger has occurred. If an authentication trigger has not occurred, the method 500 continues to track 502 user activities.

If an authentication trigger has occurred, the method 500 presents 506 an authentication challenge to the user based on the one or more tracked activities. In one embodiment, the challenge module 204 presents 506 the authentication challenge. The method 500 determines 508 whether the user's response to the authentication challenge is correct. In one embodiment, the authentication module 206 determines 508 whether the user's response to the authentication challenge is correct. If the response is correct, the method 500 grants 510 access to one or more resources, and the method 500 ends. In one embodiment, the authentication module 206 grants 510 access to the one or more resources.

If the response is not correct, the method 500 determines 512 whether a limit of incorrect responses has been reached. In one embodiment, the authentication module 206 determines 512 whether the limit of incorrect responses has been reached. If the limit has been reached, the method 500 denies 514 access to one or more resources, and the method 500 ends. In one embodiment, the authentication module 206 denies 514 access to the one or more resources. If the limit of incorrect responses has not been reached, the method 500 increases 516 the difficulty of a new authentication challenge and presents 506 the new authentication challenge, and the method 500 continues. In one embodiment, the challenge module 204 increases 516 the difficulty of the new authentication challenge, and presents 506 the new authentication challenge.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a controller comprising one or more of hardware circuits, a programmable hardware device and a processor executing code, the controller configured to:
    electronically track one or more activities of a user, wherein electronically tracking the one or more activities comprises obtaining information about at least one activity from an electronic device of the user;
    determine that the electronic device has not been stolen based on a successful authentication of the user via the electronic device;
    identify a subset of the one or more electronically tracked activities, for which information was obtained from the electronic device prior to the successful authentication, as verified activities of the user;

presentan authentication challenge to the user via a user interface for the electronic device, at a time subsequent to determining that the electronic device has not been stolen, the authentication challenge based on at least one activity from the subset of verified activities for the user; and determine whether to authenticate the user for access to one or more resources via the electronic device, based on the user's response to the authentication challenge.

2. The apparatus of claim 1, wherein the controller is further configured to determine whether an authentication trigger has occurred, the authentication trigger based on one or more of a time since a previous authentication, an attempt to access a resource, an attempt to perform an operation, and a location for the user, wherein the controller presents the authentication challenge in response to determining that the authentication trigger has occurred.

3. The apparatus of claim 1, wherein electronically tracking the one or more activities of the user comprises gathering information about one or more of a location for the user, an internet resource accessed by the user, an application used by the user, an electronic file accessed by the user, an interaction with another user, a financial transaction by the user, and a wireless network joined by the user.

4. The apparatus of claim 1, wherein the authentication challenge comprises a query such that a correct answer to the query involves the user's knowledge of the one or more activities.

5. The apparatus of claim 1, wherein a difficulty of the authentication challenge is based on a risk related to the one or more electronically tracked activities.

6. The apparatus of claim 5, wherein the difficulty of the authentication challenge increases based on an incorrect response to a previous authentication challenge, and wherein the controller is configured to deny access to the one or more resources in response to a limit of incorrect responses being reached.

7. The apparatus of claim 1, wherein the controller is configured to deny access to the one or more resources based on an incorrect response to the authentication challenge.

8. The apparatus of claim 7, wherein the controller is configured to lock the electronic device in response to a predetermined number of incorrect responses to authentication challenges.

9. The apparatus of claim 1, wherein the controller is configured to grant access to the one or more resources based on a correct response to the authentication challenge.

10. A method comprising:

electronically tracking one or more activities of a user, wherein electronically tracking the one or more activities comprises obtaining information about at least one activity from an electronic device of the user;

determining that the electronic device has not been stolen based on a successful authentication of the user via the electronic device;

identifying a subset of the one or more electronically tracked activities, for which information was obtained from the electronic device prior to the successful authentication, as verified activities of the user;

presenting an authentication challenge to the user via a user interface for the electronic device, at a time subsequent to determining that the electronic device has not been stolen, the authentication challenge based on at least one activity from the subset of verified activities for the user; and determining whether to authenticate the user for access to one or more resources via the electronic device, based on the user's response to the authentication challenge.

11. The method of claim 10, further comprising determining whether an authentication trigger has occurred, the authentication trigger based on one or more of a time since a previous authentication, an attempt to access a resource, an attempt to perform an operation, and a location for the user, wherein presenting the authentication challenge is in response to determining that the authentication trigger has occurred.

12. The method of claim 10, wherein electronically tracking the one or more activities of the user comprises gathering information about one or more of a location for the user, an internet resource accessed by the user, an application used by the user, an electronic file accessed by the user, an interaction with another user, a financial transaction by the user, and a wireless network joined by the user.

13. The method of claim 10, wherein the authentication challenge comprises a query such that a correct answer to the query involves the user's knowledge of the one or more activities.

14. The method of claim 10, wherein a difficulty of the authentication challenge is based on a risk related to the one or more electronically tracked activities.

15. The method of claim 10, further comprising denying access to the one or more resources based on an incorrect response to the authentication challenge.

16. The method of claim 10, further comprising granting access to the one or more resources based on a correct response to the authentication challenge.

17. A program product comprising a non-transitory computer readable storage medium that stores code executable by a processor, the executable code comprising code to perform:

electronically tracking one or more activities of a user, wherein electronically tracking the one or more activities comprises obtaining information about at least one activity from an electronic device of the user;

determining that the electronic device has not been stolen based on a successful authentication of the user via the electronic device;

identifying a subset of the one or more electronically tracked activities, for which information was obtained from the electronic device prior to the successful authentication, as verified activities of the user;

presenting an authentication challenge to the user via a user interface for the electronic device, at a time subsequent to determining that the electronic device has not been stolen, the authentication challenge based on at least one activity from the subset of verified activities for the user; and determining whether to authenticate the user for access to one or more resources via the electronic device, based on the user's response to the authentication challenge.

18. The program product of claim 17, the executable code further comprising code to perform:

determining whether an authentication trigger has occurred, the authentication trigger based on one or more of a time since a previous authentication, an attempt to access a resource, an attempt to perform an operation, and a location for the user, wherein presenting the authentication challenge is in response to determining that the authentication trigger has occurred.

* * * * *